US011874630B2

(12) United States Patent
Kobayashi

(10) Patent No.: US 11,874,630 B2
(45) Date of Patent: *Jan. 16, 2024

(54) PALE-COLOR TONER

(71) Applicant: KYOCERA Document Solutions Inc., Osaka (JP)

(72) Inventor: Ryota Kobayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 192 days.

This patent is subject to a terminal disclaimer.

(21) Appl. No.: 17/500,688

(22) Filed: Oct. 13, 2021

(65) Prior Publication Data

US 2022/0113645 A1 Apr. 14, 2022

(30) Foreign Application Priority Data

Oct. 14, 2020 (JP) ................................ 2020-173265

(51) Int. Cl.
*G03G 9/097* (2006.01)
*G03G 9/08* (2006.01)

(52) U.S. Cl.
CPC ....... *G03G 9/09708* (2013.01); *G03G 9/0819* (2013.01)

(58) Field of Classification Search
CPC ......................... G03G 9/09708; G03G 9/0819
See application file for complete search history.

(56) References Cited

U.S. PATENT DOCUMENTS 8,394,565 B2 3/2013 Sensui
2004/0091803 A1* 5/2004 Yamazaki ............ G03G 9/0821 430/108.1
2010/0173240 A1 7/2010 Sensui
2018/0307152 A1* 10/2018 Ito ...................... G03G 9/08795

FOREIGN PATENT DOCUMENTS

WO 2007/114502 A1 10/2007

* cited by examiner

*Primary Examiner* — Peter L Vajda
*Assistant Examiner* — Boone Alexander Evans
(74) *Attorney, Agent, or Firm* — Studebaker & Brackett PC

(57) ABSTRACT

A pale-color toner includes toner particles. The toner particles each include a toner mother particle and an external additive attached to a surface of the toner mother particle. The external additive includes specific external additive particles. The specific external additive particles have a number average primary particle diameter of at least 30 nm and no greater than 305 nm. The specific external additive particles include antimony-doped tin oxide particles. A ratio ($M_{Sb}/(M_{Sn}+M_{Sb})$) of a mass ($M_{Sb}$) of an antimony atom to a total of the mass ($M_{Sb}$) of the antimony atom and a mass ($M_{Sn}$) of a tin atom in the antimony-doped tin oxide particles is at least 0.04 and no greater than 0.31.

4 Claims, 1 Drawing Sheet

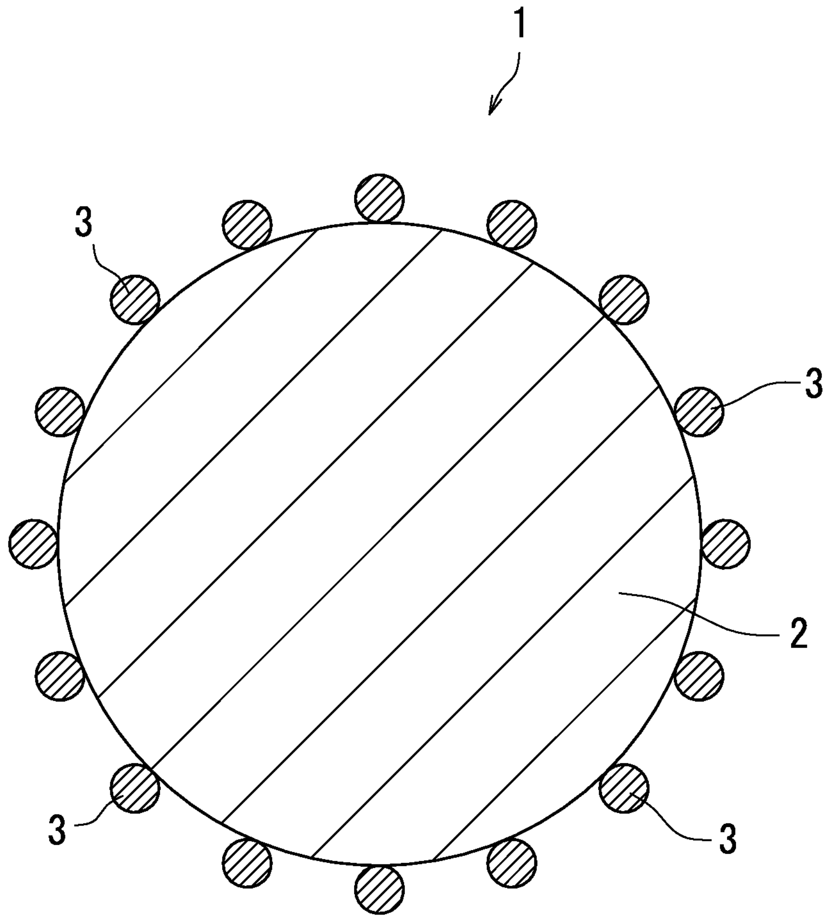
1
3
3
2
3
3

PALE-COLOR TONER

INCORPORATION BY REFERENCE

The present application claims priority under 35 U.S.C. § 119 to Japanese Patent Application No. 2020-173265, filed on Oct. 14, 2020. The contents of this application are incorporated herein by reference in their entirety.

BACKGROUND

The present disclosure relates to a pale-color toner.

In electrophotographic image formation, a pale-color toner (e.g., a yellow toner or a pale-color spot toner) including toner particles is used. The toner particles include for example toner mother particles and an external additive attached to the surfaces of the toner mother particles. Abrasion particles may be used as an external additive in the toner particles for the purpose to polish the surface of a photosensitive member (e.g., an amorphous silicon photosensitive member). Conductive fine particles subjected to hydrophobing treatment are proposed as an external additive such as above.

SUMMARY

A pale-color toner according to an aspect of the present disclosure includes toner particles. The toner particles each include a toner mother particle and an external additive attached to a surface of the toner mother particle. The external additive includes specific external additive particles. The specific external additive particles have a number average primary particle diameter of at least 30 nm and no greater than 305 nm. The specific external additive particles include antimony-doped tin oxide particles. A ratio ($M_{Sb}/(M_{Sn}+M_{Sb})$) of a mass ($M_{Sb}$) of an antimony atom to a total of the mass ($M_{Sb}$) of the antimony atom and a mass ($M_{Sn}$) of a tin atom in the antimony-doped tin oxide particles is at least 0.04 and no greater than 0.31.

BRIEF DESCRIPTION OF THE DRAWINGS

FIGURE is a diagram illustrating an example of a toner particle included in a pale-color toner according to the present disclosure.

DETAILED DESCRIPTION

The following describes a preferable embodiment of the present disclosure. Note that a toner is a collection (e.g., a powder) of toner particles. An external additive is a collection (e.g., a powder) of external additive particles. Unless otherwise stated, results (e.g., values indicating shapes or properties) of evaluations performed on a powder (more specifically, a powder of toner particles or a powder of external additive particles) each are a number average of measurements made with respect to an appropriate number of particles of the powder.

Measurements for volume median diameter ($D_{50}$) of a powder are values measured based on the Coulter principle (electrical sensing zone technique) using "COULTER COUNTER MULTISIZER 3" produced by Beckman Coulter, Inc. unless otherwise stated.

Unless otherwise stated, the number average particle diameter of a powder is the number average value of equivalent circle diameters of primary particles of the powder (Heywood diameters: diameters of circles with the same areas as projected areas of the respective particles) measured using a scanning electron microscope. The number average primary particle diameter of a powder is a number average value of equivalent circle diameters of 100 primary particles, for example. Note that the number average primary particle diameter of particles refers to a number average primary particle diameter of the particles of a powder unless otherwise stated.

Unless otherwise stated, chargeability refers to chargeability at triboelectric charging. For example, a measurement target (e.g., a toner) is triboelectrically charged by mixing and stirring the measurement target with a standard carrier (standard carrier for negatively chargeable toner use: N-01, standard carrier for positively chargeable toner use: P-01) provided by The Imaging Society of Japan. When the amount of charge of the measurement target is measured using for example a compact toner draw-off charge measurement system ("Model 212HS", product of TREK, INC.) before and after being triboelectrical charging, a larger variation in the amount of charge between before and after triboelectrical charging indicates stronger chargeability of the measurement target.

The term "main component" of a material refers to a component most contained in the material in terms of mass unless otherwise stated.

In the following description, the term "-based" may be appended to the name of a chemical compound in order to form a generic name encompassing both the chemical compound itself and derivatives thereof. When the term "-based" is appended to the name of a chemical compound to form a generic name of a polymer, it means that a repeating unit of the polymer is derived from the chemical compound or a derivative thereof.

<Pale-Color Toner>

A pale-color toner according to an embodiment of the present disclosure includes toner particles. The toner particles each include a toner mother particle and an external additive attached to the surface of the toner mother particle. The external additive includes specific external additive particles. The specific external additive particles have a number average primary particle diameter of at least 30 nm and no greater than 305 nm. The specific external additive particles include antimony-doped tin oxide particles. A ratio ($M_{Sb}/(M_{Sn}+M_{Sb})$, also referred to below as Sb ratio) of a mass ($M_{Sb}$) of an antimony atom to a total of the mass ($M_{Sb}$) of the antimony atom and a mass ($M_{Sn}$) of a tin atom in the antimony-doped tin oxide particles is at least 0.04 and no greater than 0.31.

The pale-color toner of the present disclosure can be favorably used in development of electrostatic latent images as a positively chargeable non-magnetic one-component toner, for example. For example, the pale-color toner of the present disclosure is a yellow toner or a pale-color spot toner (e.g., a white toner).

As a result of having the above features, the pale-color toner of the present disclosure can have an appropriate tint and images with desired image density can be formed with the pale-color toner. The reasons thereof are described below. The specific external additive particles included in the pale-color toner of the present disclosure include antimony-doped tin oxide particles at an Sb ratio within a specific range. The antimony-doped tin oxide particles reduce electric resistance of the pale-color toner of the present disclosure. Therefore, the pale-color toner of the present disclosure can exhibit excellent electric field responsiveness and excellent developability in development of an electrostatic latent image on a photosensitive drum. Furthermore, the specific external additive particles have a number average primary particle diameter of at least 30 nm, and accordingly are not excessively small particles. Therefore, the specific external additive particles are hardly buried in the toner mother particles in continuous image formation. Further, the specific external additive particles have a number average primary particle diameter of no greater than 305 nm, and accordingly are not excessively large particles. Therefore, the specific external additive particles hardly detach from the toner mother particles in continuous image formation. As such, as a result of the number average primary particle diameter of the specific external additive particles being set to at least 30 nm and no greater than 305 nm, the specific external additive particles can stably remain attached to the surfaces of the toner mother particles even in continuous image formation. As a result, images with desired image density can be formed with the pale-color toner of the present disclosure.

Furthermore, the antimony-doped tin oxide particles with an excessively high Sb ratio (e.g., a Sb ratio of greater than 0.31) has a tinge of black and change the tint of a toner. A phenomenon in which antimony-doped tin oxide particles with an excessively high Sb ratio changes the tint of a toner has a small impact on a dark-color toner (e.g., a black toner, a magenta toner, or a cyan toner) while having a large impact on a pale-color toner (particularly, a yellow toner). In the pale-color toner of the present disclosure, the Sb ratio in the antimony-doped tin oxide particles is set to no greater than 0.31 to inhibit tint change of the pale-color toner caused due to the presence of the antimony-doped tin oxide particles. As a result, the pale-color toner of the present disclosure has an appropriate tint.

The pale-color toner of the present disclosure is described below further in detail. Note that one type of each component described below may be used independently or two or more types of the component may be used in combination unless otherwise stated.

[Toner Particles]

FIGURE illustrates an example of a toner particle 1 included in the pale-color toner. The toner particle 1 illustrated in FIGURE includes a toner mother particle 2 and an external additive 3 attached to the surface of the toner mother particle 2. The external additive 3 includes specific external additive particles.

However, the toner particles included in the pale-color toner of the present disclosure may have a structure different from that of the toner particle 1 illustrated in FIGURE. Specifically, the toner particles may include only the specific external additive particles as the external additive or may additionally include any other external additive particles (also referred to below as additional external additive particles). Furthermore, the toner particles may be toner particles (also referred to below as capsule toner particles) including shell layers. The toner mother particles of the capsule toner particles each include a toner core containing for example a binder resin and a colorant and a shell layer covering the surface of the toner core. Details of the toner particles included in the pale-color toner of the present disclosure have been described so far with reference to FIGURE.

The degree to which the pale-color toner of the present disclosure has an appropriate tint can be expressed by ΔE that is a difference between an Lab value A and an Lab value B. Here, the Lab value A represents an Lab value of a pellet originated from the pale-color toner of the present disclosure and the value Lab B represents an Lab value of the pellet originated from the toner mother particles. AE is measured by a method described in Examples or a method that conforms to the above method. The smaller ΔE is, the less the tint of the pale-color toner of the present disclosure changes due to the presence of the specific external additive particles. Therefore, a small ΔE is preferable. AE of the pale-color toner of the present disclosure is preferably no greater than 8.5, and more preferably no greater than 6.0.

(Specific External Additive Particles)

The specific external additive particles include antimony-doped tin oxide particles. The specific external additive particles have a number average primary particle diameter of at least 30 nm and no greater than 305 nm, preferably at least 60 nm and no greater than 250 nm, and more preferably at least 100 nm and no greater than 200 nm. As a result of the number average primary particle diameter of the specific external additive particles being set to at least 30 nm, the specific external additive particles can be inhibited from being buried in the toner mother particles in continuous image formation. As a result of the number average primary particle diameter of the specific external additive particles being set to no greater than 305 nm, the specific external additive particles can be inhibited from detaching from the toner mother particles in continuous image formation.

The antimony-doped tin oxide particles are particles containing antimony-doped tin oxide (ATO) as a main component. The percentage content of the antimony-doped tin oxide in the antimony-doped tin oxide particles is preferably at least 70% by mass, more preferably at least 90% by mass, and further preferably 100% by mass.

The Sb ratio ($M_{Sb}/(M_{Sn}+M_{Sb})$) in the antimony-doped tin oxide particles is at least 0.04 and no greater than 0.31, preferably at least 0.10 and no greater than 0.31, and more preferably at least 0.20 and no greater than 0.28. Here, tin oxide does not exhibit conductivity by itself. Tin oxide to which a small amount of antimony has been added (at an Sb ratio of at least 0.04 and no greater than 0.31) is endowed with the properties of a semiconductor to exhibit conductivity. Tin oxide to which a large amount of antimony has been added has properties of a simple mixture of tin oxide and antimony, and accordingly does not exhibit conductivity. Thus, conductivity of the antimony-doped tin oxide particles can be increased by setting the Sb ratio to at least 0.04 and no greater than 0.31. As a result, images with desired image density can be formed with the pale-color toner of the present disclosure. Also, change in tint of the pale-color toner of present disclosure caused due to the presence of the antimony-doped tin oxide particles can be inhibited by setting the Sb ratio to no greater than 0.31.

The specific external additive particles are prepared for example from tin chloride and antimony chloride as materials. As such, a chlorine atom derived from the materials may remain in the specific external additive particles. A chlorine atom has high electronegativity. Therefore, specific external additive particles containing a large amount of chlorine atoms tend to decrease positive chargeability of a toner and slightly decrease image density of a formed image. In view of the foregoing, the specific external additive particles preferably contain no chlorine atoms or contain chlorine atoms of which percentage content is greater than 0.000% by mass and no greater than 0.020% by mass.

However, the specific external additive particles preferably contain a small amount of chlorine atoms. The pale-color toner of the present disclosure, which includes the specific external additive particles, has relatively low electric resistance. As such, a phenomenon may occur in which charge injection is caused by positive bias of a development roller in development to increase the amount of charge of the pale-color toner of the present disclosure. Even when the above phenomenon occurs in a normal environment, the pale-color toner of the present disclosure is not excessively charged. However, when the above phenomenon occurs in a low-temperature and low-humidity environment, which is an environment in which the amount of charge of a toner tends to increase, the pale-color toner of the present disclosure may be excessively charged. In a case in which the pale-color toner of the present disclosure is a non-magnetic one-component toner, excessive charging of the pale-color toner of the present disclosure leads to an excessive increase in image force between the pale-color toner of the present disclosure and a development roller to increase the layer thickness of a toner layer on the development roller. By contrast, in a case in which the pale-color toner of the present disclosure contains a small amount of chlorine atoms, positive chargeability of the pale-color toner of the present disclosure decreases moderately. As a result, excessive charging of the pale-color toner of the present disclosure can be inhibited even in a low-temperature and low-humidity environment. From the above, the specific external additive particles preferably contain a small amount of chlorine atoms. Specifically, a content percentage of the chlorine atoms in the specific external additive particles is preferably at least 0.001% by mass and no greater than 0.020% by mass, and more preferably at least 0.003% by mass and no greater than 0.010% by mass.

The content of the specific external additive particles in the toner particles is preferably at least 0.05 parts by mass and no greater than 5.0 parts by mass relative to 100 parts by mass of the toner mother particles, and more preferably at least 0.3 parts by mass and no greater than 1.0 part by mass. As a result of the content of the specific external additive particles being set to at least 0.05 parts by mass and no greater than 5.0 parts by mass, formation of images with desired image density with the pale-color toner of the present disclosure can be further ensured.

An example of a preparation method of the specific external additive particles is described. An alkaline aqueous solution (e.g., an ammonia aqueous solution) and an acid aqueous solution obtained by dissolving tin chloride (e.g., stannic chloride) and antimony chloride (e.g., antimony trichloride) in hydrochloric acid are added to water. Through the above, a suspension containing antimony-doped tin oxide is obtained. Thereafter, the solid content in the suspension undergoes washing, drying, and then pulverization, thereby obtaining the specific external additive particles. In addition of the above acid aqueous solution and the alkaline aqueous solution, it is preferable to keep the pH and the temperature of the suspension within respective specific ranges (e.g., a pH range from at least 6.5 to no greater than 9.0 and a temperature range from at least 60° C. and no higher than 80° C.). In washing as above, adjustment of the number of times of washing can adjust the content ratio of the chlorine atoms to the specific external additive particles. Specifically, in washing as above, an increase in the number of times of washing decreases the content ratio of the chlorine atoms in the specific external additive particles. In addition, in pulverization as above, adjustment of pulverization conditions can adjust the number average primary particle diameter of the specific external additive particles.

(Additional External Additive Particles)

The external additive may include only the specific external additive particles, but it is preferable to further include additional external additive particles. The additional external additive particles are preferably inorganic particles, more preferably silica particles or particles of a metal oxide (e.g., alumina, titanium oxide, magnesium oxide, or zinc oxide), and further preferably silica particles or titanium oxide particles. However, resin particles or particles of an organic acid compound such as a fatty acid metal salt (e.g., zinc stearate) may be used as the additional external additive particles.

The content of the additional external additive particles in the toner particles is preferably at least 0.1 parts by mass and no greater than 15.0 parts by mass relative to 100 parts by mass of the toner mother particles in terms of sufficient exhibition of its function with inhibition of detachment thereof from the toner mother particles, and more preferably at least 1.0 part by mass and no greater than 5.0 parts by mass.

(Toner Mother Particles)

The toner mother particles contain a binder resin as a main component, for example. The toner mother particles may further contain an internal additive (e.g., at least one of a colorant, a releasing agent, a charge control agent, and a magnetic powder) as necessary. Examples of a production method of the toner mother particles include a pulverization method and an aggregation method, and the pulverization method is preferable.

(Binder Resin)

In terms of imparting excellent low-temperature fixability to the pale-color toner of the present disclosure, the toner mother particles preferably contain a thermoplastic resin as the binder resin and further preferably contain the thermoplastic resin at a percentage content of at least 85% by mass relative to the total of the binder resin. Examples of the thermoplastic resin include styrene resins, acrylic ester resins, olefin resins (e.g., polyethylene resins and polypropylene resins), vinyl resins (e.g., vinyl chloride resins, polyvinyl alcohols, vinyl ether resins, and N-vinyl resins), polyester resins, polyamide resins, and urethane resins. Alternatively, a copolymer of any of the above resins, that is, a copolymer (e.g., styrene-acrylic ester resin or styrene-butadiene resin) in which any repeating unit has been introduced into the resin can be used as the binder resin.

The percentage content of the binder resin in the toner mother particles is preferably at least 60% by mass and no greater than 95% by mass, and more preferably at least 75% by mass and no greater than 90% by mass.

In terms of increasing low-temperature fixability of the pale-color toner of the present disclosure, the binder resin is preferably a polyester resin. A polyester resin can be obtained by condensation polymerization of one or more polyhydric alcohols and one or more polycarboxylic acids. Examples of an alcohol used for synthesis of the polyester resin include dihydric alcohols (e.g., diol compounds and bisphenol compounds) and tri- or higher-hydric alcohols. Examples of a carboxylic acid used for synthesis of the polyester resin include dibasic carboxylic acids and tri- or higher-basic carboxylic acids. Note that a polybasic carboxylic acid derivative (e.g., an anhydride of a polybasic carboxylic acid or a polybasic carboxylic acid halide) that can form an ester bond through condensation polymerization may be used instead of the polybasic carboxylic acid.

Examples of the diol compounds include ethylene glycol, diethylene glycol, triethylene glycol, 1,2-propanediol, 1,3-propanediol, 1,4-butanediol, neopentyl glycol, 2-butene-1,4-diol, 1,5-pentanediol, 2-pentene-1,5-diol, 1,6-hexanediol, 1,4-cyclohexanedimethanol, dipropylene glycol, 1,4-benzenediol, polyethylene glycol, polypropylene glycol, and polytetramethylene glycol.

Examples of the bisphenol compounds include bisphenol A, hydrogenated bisphenol A, ethylene oxide adduct of bisphenol A (e.g., polyoxyethylene(2,2)-2,2-bis(4-hydroxyphenyl)propane), and propylene oxide adduct of bisphenol A.

Examples of the tri- or higher-hydric alcohols include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Examples of the dibasic carboxylic acids include maleic acid, fumaric acid, citraconic acid, itaconic acid, glutaconic acid, phthalic acid, isophthalic acid, terephthalic acid, cyclohexanedicarboxylic acid, adipic acid, sebacic acid, azelaic acid, malonic acid, succinic acid, alkyl succinic acids (specific examples include n-butylsuccinic acid, isobutylsuccinic acid, n-octylsuccinic acid, n-dodecylsuccinic acid, and isododecylsuccinic acid), and alkenyl succinic acids (specific examples include n-butenylsuccinic acid, isobutenylsuccinic acid, n-octenylsuccinic acid, n-dodecenylsuccinic acid, and isododecenylsuccinic acid).

Examples of the tri- or higher-basic carboxylic acids include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylene-carboxylpropane, 1,2,4-cyclohexanetricarboxylic acid, tetra(methylenecarboxyl)methane, 1,2,7,8-octanetetracarboxylic acid, pyromellitic acid, and Empol trimer acid.

A condensation polymer of ethylene oxide adduct of bisphenol A, terephthalic acid, and trimellitic anhydride is preferable as the polyester resin.

(Colorant)

The toner mother particles preferably contain a colorant. The colorant can be for example a known pigment or dye that matches the color of the pale-color toner of the present disclosure. In terms of forming high-quality images with the pale-color toner of the present disclosure, the content ratio of the colorant is preferably at least 1 part by mass and no greater than 20 parts by mass relative to 100 parts by mass of the binder resin.

The toner mother particles may contain a non-black colorant. An example of the non-black colorant is a yellow colorant.

The toner mother particles may contain a white colorant. Examples of the white colorant include titanium dioxide, zinc oxide (zinc white), lithopone, and white lead.

The toner mother particles preferably contain a yellow colorant.

At least one compound selected from the group consisting of a condensed azo compound, an isoindolinone compound, an anthraquinone compound, an azo metal complex, a methine compound, and an arylamide compound can be used as the yellow colorant. Examples of the yellow colorant include C.I. Pigment Yellow (3, 12, 13, 14, 17, 62, 74, 83, 93, 94, 95, 97, 109, 110, 111, 120, 127, 128, 129, 147, 151, 154, 155, 168, 174, 175, 176, 180, 181, 191, or 194), Naphthol Yellow S, Hansa Yellow G, and C.I. Vat Yellow.

(Releasing Agent)

The toner mother particles may contain a releasing agent. The releasing agent is used for the purpose to impart offset resistance to the pale-color toner of the present disclosure, for example. In terms of imparting sufficient offset resistance to the pale-color toner of the present disclosure, the content ratio of the releasing agent is preferably at least 1 part by mass and no greater than 20 parts by mass relative to 100 parts by mass of the binder resin.

Examples of the releasing agent include aliphatic hydrocarbon-based waxes, oxides of aliphatic hydrocarbon-based waxes, plant waxes, animal waxes, mineral waxes, ester waxes having a fatty acid ester as a main component, and waxes in which a fatty acid ester has been partially or fully deoxidized. Examples of the aliphatic hydrocarbon-based waxes include low molecular weight polyethylene, low molecular weight polypropylene, polyolefin copolymers, polyolefin wax, microcrystalline wax, paraffin wax, and Fischer-Tropsch wax. Examples of the oxides of aliphatic hydrocarbon-based waxes include oxidized polyethylene wax and block copolymers of oxidized polyethylene wax. Examples of the plant waxes include candelilla wax, carnauba wax, Japan wax, jojoba wax, and rice wax. Examples of the animal waxes include beeswax, lanolin, and spermaceti. Examples of the mineral waxes include ozokerite, ceresin, and petrolatum. Examples of the ester waxes having a fatty acid ester as a main component include montanic acid ester wax and castor wax. Examples of the waxes in which a fatty acid ester has been partially or fully deoxidized include deoxidized carnauba wax. Preferably, the releasing agent is a carnauba wax.

In a case in which the toner mother particles contain a releasing agent, a compatibilizer may be added to the toner mother particles in order to improve compatibility between the binder resin and the releasing agent.

(Charge Control Agent)

The toner mother particles may contain a charge control agent. The charge control agent is used for the purpose to provide a toner with further excellent charge stability or excellent charge rise characteristic, for example. The charge rise characteristic of a toner is an indicator as to whether or not the toner can be charged to a specific charging level in a short period of time. Cationic strength of the toner mother particles can be increased by the toner mother particles containing a positively chargeable charge control agent.

Examples of the positively chargeable charge control agent include azine compounds, direct dyes, acid dyes, alkoxylated amine, alkylamide, quaternary ammonium salt compounds, and resins having a quaternary ammonium cation group. Preferably, the charge control agent is a quaternary ammonium salt compound.

Examples of the azine compounds include pyridazine, pyrimidine, pyrazine, 1,2-oxazine, 1,3-oxiazine, 1,4-oxiazine, 1,2-thiazine, 1,3-thiazine, 1,4-thiazine, 1,2,3-triazine, 1,2,4-triazine, 1,3,5-triazine, 1,2,4-oxadiazine, 1,3,4-oxadiazine, 1,2,6-oxadiazine, 1,3,4-thiadiazine, 1,3,5-thiadiazine, 1,2,3,4-tetrazine, 1,2,4,5-tetrazine, 1,2,3,5-tetrazine, 1,2,4,6-oxatriazine, 1,3,4,5-oxatriazine, phthalazine, quinazoline, and quinoxaline.

Examples of the direct dyes include Azine Fast Red FC, Azine Fast Red 12BK, Azine Violet BO, Azine Brown 3G, Azine Light Brown GR, Azine Dark Green BH/C, Azine Deep Black EW, and Azine Deep Black 3RL.

Examples of the acid dyes include nigrosine BK, nigrosine NB, and nigrosine Z.

Examples of quaternary ammonium salt compounds include benzyldecylhexylmethyl ammonium chloride, decyltrimethyl ammonium chloride, 2-(methacryloyloxy) ethyl trimethylammonium chloride, and dimethylaminopropyl acrylamide methyl chloride quaternary salt.

In terms of providing a pale-color toner with further excellent charge stability, the content ratio of the charge control agent is preferably at least 0.1 parts by mass and no greater than 10 parts by mass relative to 100 parts by mass of the binder resin.

[Pale-Color Toner Production Method]

The pale-color toner of the present disclosure can be produced by a production method for example including toner mother particle preparation and external additive addition.

(Toner Mother Particle Preparation)

In the toner mother particle preparation, the toner mother particles are prepared by an aggregation method or a pulverization method, for example.

The aggregation method includes an aggregation process and a coalescence process. In the aggregation process, fine particles containing the components of the toner mother particles are caused to aggregate in an aqueous medium to form aggregated particles. In the coalescence process, the components in the aggregated particles are caused to coalesce in the aqueous medium to form the toner mother particles.

The pulverization method is described next. The pulverization method can make it relatively easy to prepare toner mother particles and reduce production cost. In preparation of the toner mother particles by the pulverization method, the toner mother particle preparation includes a melt-kneading process and a pulverizing process, for example. The toner mother particle preparation may further include a mixing process before the melt-kneading process. Alternatively or additionally, the toner mother particle preparation may further include after the pulverizing process at least one of a finely pulverizing process and a classifying process.

In the mixing process, the binder resin and an internal additive added as necessary are mixed to yield a mixture. In the melt-kneading process, a toner material is melted and kneaded to yield a melt-kneaded product. The mixture yielded in the mixing process is used as the toner material, for example. In the pulverizing process, the resultant melt-kneaded product is cooled to for example room temperature (25° C.) and then pulverized, thereby yielding a pulverized product. When the pulverized product yielded in the pulverizing process is needed to be reduced in diameter, a process of further pulverizing the pulverized product (finely pulverizing process) may be performed. In order to average the particle diameter of the pulverized product, a process of classifying the yielded pulverized product (classifying process) may be performed. Through the above processes, the toner mother particles that are the pulverized product are obtained.

(External Additive Addition)

In the external additive addition, the aforementioned toner mother particles and an external additive are mixed using a mixer to attach the external additive to the surfaces of the toner mother particles. Through the above, the pale-color toner of the present disclosure is obtained. The external additive includes the specific external additive particles and the additional external additive particles used as necessary. The mixer may be an FM mixer (product of Nippon Coke & Engineering Co., Ltd.), for example.

EXAMPLES

The present disclosure will be described further in detail using examples. However, the present disclosure is not limited to the scope of the examples.

[Preparation of External Additive Particles]

External additive particles (a) to (n) were prepared by the following methods.

(External Additive Particles (a))

A reaction vessel was charged with 2 L of water. After being heated, the reaction vessel was kept warm to keep the temperature of the water at 70° C. Separately, an acid solution was prepared by dissolving 825 g of stannic chloride ($SnCl_4 \cdot 5H_2O$) and 175 g of antimony trichloride ($SbCl_3$) in 1 L of 2.4N hydrochloric acid. An aqueous ammonia solution (ammonia concentration 1 mol/L) and the acid solution were dripped in parallel into the reaction vessel containing the water at 70° C. over 1 hour. In the parallel dripping, the amount of the aqueous ammonia solution added was adjusted so as to keep the contents of the reaction vessel at a pH of 7 to 8. Through the parallel dripping, the contents of the reaction vessel were suspended. Next, the suspension in the reaction vessel was filtrated under reduced pressure. In the filtration under reduced pressure, a 2-L Buchner funnel, a 1.1-L funnel (product of ASAHI SEISAKUSHO CO., LTD.), and filter paper ("No. 131", product of ADVANTEC TOYO KAISHA, LTD.) were used. Next, the resultant residue remaining on the filter paper was washed (washing) by pouring 1 L of water from above. The above washing was performed 6 times in total. The electrical conductivity of the residue after the washing was measured using an electrical conductivity meter ("ES-51", product of HORIBA, Ltd.) to be 10 μS/cm. The residue after the washing was dried at 110° C. for 12 hours, and then baked for 2 hours at 700° C. using an electric furnace. Thereafter, the residue after the baking was pulverized using a pulverizer ("Impact Type Supersonic Jet Mill CPY+DSF", product of Nippon Pneumatic Mfg. Co., Ltd.). The pulverization of the residue after the baking was performed using a ceramic flat plate as a target plate under conditions of a material feeding speed of 7.0 kg/hour and a pulverization pressure of 0.5 MPa. Through the above, the external additive particles (a) were obtained.

(External Additive Particles (b) to (l))

External additive particles (b) to (l) were prepared according to the same method as that for preparing the external additive particles (a) in all aspects other than the following changes. In preparation of the external additive particles (b) to (l), the amounts of stannic chloride and antimony trichloride, the number of times of the filtration in the washing, and the pulverization conditions were changed as shown in Table 1 below.

(External Additive Particles (m))

A reaction vessel was charged with 2 L of water and 100 g of titanium oxide particles ("AEROXIDE (registered Japanese trademark) P25", product of Nippon Aerosil Co., Ltd.), and the titanium oxide particles were dispersed in the water. After being heated, the reaction vessel was kept warm to keep the temperature of the dispersion at 70° C. Separately, an acid solution was prepared by dissolving 413 g of stannic chloride ($SnCl_4 \cdot 5H_2O$) and 88 g of antimony trichloride ($SbCl_3$) in 1 L of 2.4N hydrochloric acid. An aqueous ammonia solution (ammonia concentration 1 mol/L) and the acid solution were dripped in parallel into the reaction vessel containing the dispersion at 70° C. over 1 hour. In the parallel dripping, the amount of the aqueous ammonia solution added was adjusted so as to keep the contents of the reaction vessel at a pH of 7 to 8. Through the parallel dripping, the contents of the reaction vessel were suspended. Next, the suspension in the reaction vessel was filtrated under reduced pressure. In the filtration under reduced pressure, a 2-L Buchner funnel, a 1.1-L funnel (product of ASAHI SEISAKUSHO CO., LTD.), and filter paper ("No. 131", product of ADVANTEC TOYO KAISHA, LTD.) were used. Next, the resultant residue remaining on the filter paper was washed (washing) by pouring 1 L of water from above. The washing was performed 6 times in total. The electrical conductivity of the residue after the washing was measured using an electrical conductivity meter ("ES-51", product of HORIBA, Ltd.) to be 10 µS/cm. The residue after the washing was dried at 110° C. for 12 hours, and then baked at 700° C. for 2 hours using an electric furnace. Thereafter, the residue after the baking was pulverized using a pulverizer ("Impact Type Supersonic Jet Mill CPY+DSF", product of Nippon Pneumatic Mfg. Co., Ltd.). The pulverization of the residue after the baking was performed using a ceramic flat plate as a target plate under conditions of a material feeding speed of 6.0 kg/hour and a pulverization pressure of 0.5 MPa. Through the above, external additive particles (m) were obtained.

(External Additive Particles (n))

Titanium oxide particles ("AEROXIDE (registered Japanese trademark) P25", product of Nippon Aerosil Co., Ltd.) were used as external additive particles (n).

(Particle Diameter Measurement)

The number average primary particle diameter of each of the external additives was measured using pale-color toners obtained after later-described external additive addition. Specifically, a sectional image of each of the pale-color toners (magnification: 30,000×) was captured using a scanning electron microscope ("JSM-6700F", product of JEOL Ltd.). Based on the captured sectional image, equivalent circle diameters of 100 external additive particles (specifically, any one type of the external additive particles (a) to (n)) were analyzed using image analysis software ("WinROOF", product of MITANI CORPORATION) and the average value thereof was taken to be a number average primary particle diameter of the external additive particles.

TABLE 1

| | Type | $SnCl_4$•$5H_2O$ [g] | $SbCl_3$ [g] | Pulverization conditions: Material feeding speed [kg/h] | Pulverization conditions: Pulverization pressure [MPa] | Washing [times] | Electrical conductivity [µS/cm] |
|---|---|---|---|---|---|---|---|
| a | ATO | 825 | 175 | 7.0 | 0.5 | 6 | 10 |
| b | ATO | 981 | 19 | 7.0 | 0.5 | 6 | 10 |
| c | ATO | 968 | 32 | 7.0 | 0.5 | 6 | 10 |
| d | ATO | 786 | 214 | 7.0 | 0.5 | 6 | 10 |
| e | ATO | 770 | 230 | 7.0 | 0.5 | 6 | 10 |
| f | ATO | 825 | 175 | 3.5 | 0.8 | 6 | 10 |
| g | ATO | 825 | 175 | 4.0 | 0.8 | 6 | 10 |
| h | ATO | 825 | 175 | 7.0 | 0.4 | 6 | 10 |
| i | ATO | 825 | 175 | 8.0 | 0.4 | 6 | 10 |
| j | ATO | 825 | 175 | 7.0 | 0.5 | 4 | 50 |
| k | ATO | 825 | 175 | 7.0 | 0.5 | 2 | 200 |
| l | ATO | 825 | 175 | 7.0 | 0.5 | 1 | 300 |
| m | Conductive titanium oxide | 413 | 88 | 6.0 | 0.5 | 6 | 10 |
| n | Titanium oxide | — | — | — | — | — | — |

(Fluorescent X-Ray Analysis)

With respect to each type of the external additive particles (a) to (n), analysis was performed using fluorescent X-rays, and an "Sb ratio ($M_{Sb}/(M_{Sn}+M_{Sb})$)" and a content ratio of chlorine atoms were calculated based on the analysis result. Results are shown in Table 2 below. The conditions for the fluorescent X-ray analysis were as follows. Note that in calibration in the fluorescent X-ray analysis, multiple calibration samples were used in which tin oxide ($SnO_2$), antimony pentoxide, and sodium chloride have been mixed at specific blending ratios.

(Conditions for Fluorescent X-Ray Analysis)

Sample: columnar pellet obtained by press forming external additive particles at a pressure of 20 MPa for 3 seconds Analyzing device: scanning fluorescent X-ray analyzer ("ZSX", product of Rigaku Corporation)

X-ray tube (X-ray source): rhodium (Rh)

Excitation condition: tube voltage of 50 kV and tube current of 50 mA

Measurement range (X-ray irradiation range): diameter of 30 mm

Measured elements: antimony, chlorine, and tin

Results are shown in Table 2 below.

TABLE 2

| | Type | Sb ratio [% by mass] | Particle diameter [nm] | Chlorine atom [% by mass] |
|---|---|---|---|---|
| a | ATO | 25 | 150 | 0 |
| b | ATO | 3 | 150 | 0 |
| c | ATO | 5 | 149 | 0 |
| d | ATO | 30 | 149 | 0 |
| e | ATO | 32 | 150 | 0 |
| f | ATO | 25 | 20 | 0 |
| g | ATO | 25 | 31 | 0 |
| h | ATO | 26 | 301 | 0 |
| i | ATO | 25 | 311 | 0 |
| j | ATO | 26 | 152 | 0.005 |
| k | ATO | 25 | 149 | 0.019 |
| l | ATO | 25 | 151 | 0.032 |
| m | Conductive titanium oxide | 25 | 470 | 0 |
| n | Titanium oxide | — | 20 | — |

Of the external additive particles (a) to (n), the external additive particles (a), (c), (d), (g), (h), and (j) to (1) were the specific external additive particles.

[Binder Resin Preparation]

A reaction vessel was charged with 1.0 mol of polyoxyethylene(2,2)-2,2-bis(4-hydroxyphenyl)propane, 4.5 mol of terephthalic acid, mol of trimellitic anhydride, and 4 g of dibutyl tin oxide. The contents of the reaction vessel were caused to react for 8 hours at 230° C. in a nitrogen atmosphere. Thereafter, an unreacted component in the reaction vessel was distilled under reduced pressure byreducing the air pressure in the reaction vessel to 8.3 kPa. Thereafter, the contents (polyester resin) of the reaction vessel were washed and dried. Through the above, a polyester resin with a softening point of 120° C. was obtained. The obtained polyester resin was used as the binder resin.

[Toner Mother Particle Preparation]

Using an FM mixer ("FM-20B", product of Nippon Coke & Engineering Co., Ltd.), 100 parts by mass of the polyester resin as the binder resin, 4 parts by mass of Pigment Yellow 74 ("SEIKAFAST YELLOW 7040Y", product of Dainichiseika Color & Chemicals Mfg. Co., Ltd.) as the yellow colorant, 10 parts by mass of a carnauba wax ("CARNAUBA No. 1", product of S. Kato & Co.) as the releasing agent, and 3 parts by mass of a quaternary ammonium salt compound ("FCA210PS", product of FUJIKURA KASEI CO., LTD.) as the charge control material were mixed together. Thereafter, the resultant mixture was melted and kneaded at 150° C. using a twin screw extruder ("TEM45", product of Toshiba Machine Co., Ltd.). The resultant melt-kneaded product was cooled then. The cooled melt-kneaded product was coarsely pulverized using a FEATHER MILL (registered Japanese trademark) ("Model 350×600", product of Hosokawa Micron Corporation). The resultant coarsely pulverized product was finely pulverized using an airflow pulverizer ("JET MILL Model IDS-2", product of Nippon Pneumatic Mfg. Co., Ltd.). The resultant finely pulverized product was classified using an elbow jet classifier ("ELBOW JET Model EJ-LABO", product of Nittetsu Mining Co., Ltd.). Through the above, toner mother particles with a volume median diameter of 7 μm were obtained. Note that the volume median diameter of the toner mother particles was measured using a particle size analyzer ("COULTER COUNTER MULTISIZER 3", product of Beckman Coulter, Inc.).

[External Additive Addition]

Using an FM mixer ("FM-10", product of Nippon Coke & Engineering Co., Ltd.), 100.0 parts by mass of the toner mother particles, 1.5 parts by mass of silica particles ("AEROSIL" (registered Japanese trademark) REA90", product of Nippon Aerosil Co., Ltd.) as the external additive, and a corresponding amount and a corresponding type of the external additive particles shown in Table 3 below were mixed. Through the above, pale-color toners (yellow toners) of Examples 1 to 8 and Comparative Examples 1 to 7 were obtained. Note that only the silica particles were used as the external additive in Comparative Example 5.

<Evaluation>

With respect to each of the pale-color toners of Examples 1 to 8 and Comparative Examples 1 to 7, the tint and image density and fixability of images formed with the pale-color toner were evaluated by the following methods. Evaluation results are shown in Table 3 below.

[Evaluation Apparatus]

A monochrome printer ("HL-1218W", product of BROTHER INDUSTRIES, LTD.) was used as an evaluation apparatus. The pale-color toner (specifically, any of the pale-color toners of Examples 1 to 8 and Comparative Examples 1 to 7) was loaded in a development device of the evaluation apparatus. The development device of the evaluation apparatus served also as a toner container. That is, the evaluation apparatus is a monochrome printer provided with a replaceable development device. Printing paper used was "MULTIPAPER SUPER WHITE+(registered Japanese trademark)" produced by ASKUL Corporation.

[Image Density]

A pattern image with a printing rate of 5% was continuously formed on 1500 sheets of the printing paper using the evaluation apparatus under conditions of a temperature of 23° C. and a relative humidity of 50%. Thereafter, a solid image (toner application amount: 0.7 mg/cm 2) was formed on a sheet of the printing paper. The image density (ID) of the formed solid image was measured using a reflectance densitometer ("RD914", product of X-Rite Inc.). Image density was evaluated based on the following criteria.

(Criteria for Image Density Evaluation)

A (very good): ID of at least 1.3

B (good): ID of at least 1.1 and less than 1.3

C (poor): ID of less than 1.1

[Tint]

A pellet (diameter 20 mm) was formed by charging 0.2 g of any of the pale-color toners of Examples 1 to 8 and Comparative Examples 1 to 7 and 0.2 g of the toner mother particles into a forming machine "LABODIES φ20", product of LABONECT, LTD.) and applying pressure (15 MPa) using a hydraulic press machine ("LABOPRESS LP-100", product of LABONECT, LTD.). The Lab value A of the pellet originated from each pale-color toner and the Lab value B of the pellet originated from the toner mother particles were measured using a reflectance densitometer ("SpectroEye (registered Japanese trademark)", product of X-Rite Inc.). A ΔE, which is the difference between the Lab value$_A$ and the Lab value$_B$, was obtained for each pale-color toner. Whether or not the pale-color toner had an appropriate tint was evaluated based on the obtained ΔE. In detail, according to the following criteria, a pale-color toner with a large ΔE was evaluated as having an inappropriate tint because of change in tint caused due to the presence of the external additive particles.

(Tint Change)

A (very good): ΔE of less than 6.0

B (good): ΔE of at least 6.0 and less than 8.5

C (poor): ΔE of greater than 8.5

[Fixability]

A solid image (toner application amount: 0.7 mg/cm 2) was formed on a sheet of the printing paper using the evaluation apparatus under conditions of a temperature of and a relative humidity of 10%. The following fold-rubbing test was performed on the printing paper (evaluation paper) with the solid image formed thereon to determine whether or not offset has occurred. In the fold-rubbing test, the evaluation paper was folded in half such that the surface with the solid image formed thereon was folded inwards and the fold passed through the center of the solid image. Next, the fold of the folded evaluation paper was rubbed back and forth 5 times with a load of 1 kg applied using a brass weight (1 kg) covered with cotton cloth. Subsequently, the evaluation paper was opened up, and the length of pale-color toner peeling (peeling length) in a part of the folded portion of the evaluation paper to which the solid image has been fixed was measured. Fixability was evaluated based on the following criteria.

(Criteria for Fixability Evaluation)

A (very good): pealing length of less than 0.07 mm

B (good): peeling length of at least 0.07 mm and less than 0.10 mm

C (poor): pealing length of at least 0.10 mm

TABLE 3

| | External additive particles | | | | | | Fixability | |
|---|---|---|---|---|---|---|---|---|
| | | Part | Tint | | Image density | | Peeling length | |
| | Type | by mass | Δ E | Evaluation | ID | Evaluation | [mm] | Evaluation |
| Example 1 | a | 0.5 | 7.7 | B | 1.43 | A | 0.08 | B |
| Example 2 | c | 0.5 | 5.3 | A | 1.15 | B | 0.08 | B |
| Example 3 | d | 0.5 | 8.4 | B | 1.28 | B | 0.06 | A |
| Example 4 | g | 0.5 | 7.7 | B | 1.13 | B | 0.08 | B |
| Example 5 | h | 0.5 | 7.8 | B | 1.14 | B | 0.09 | B |
| Example 6 | j | 0.5 | 7.8 | B | 1.32 | A | 0.05 | A |
| Example 7 | k | 0.5 | 7.6 | B | 1.13 | B | 0.03 | A |
| Example 8 | l | 0.5 | 7.7 | B | 1.14 | B | 0.03 | A |
| Comparative Example 1 | b | 0.5 | 5.2 | A | 1.07 | C | 0.08 | B |
| Comparative Example 2 | e | 0.5 | 8.7 | C | 1.24 | B | 0.08 | B |
| Comparative Example 3 | f | 0.5 | 7.6 | B | 1.06 | C | 0.07 | B |
| Comparative Example 4 | i | 0.5 | 7.7 | B | 1.07 | C | 0.08 | B |
| Comparative Example 5 | — | — | 3.6 | A | 0.99 | C | 0.09 | B |
| Comparative Example 6 | m | 0.5 | 5.3 | A | 1.01 | C | 0.08 | B |
| Comparative Example 7 | n | 0.5 | 2.0 | A | 0.74 | C | 0.04 | A |

The pale-color toners of Examples 1 to 8 each included toner particles. The toner particles each included a toner mother particle and an external additive attached to the surface of the toner mother particle. The external additive included the specific external additive particles. The specific external additive particles had a number average primary particle diameter of at least 30 nm and no greater than 305 nm. The specific external additive particles included antimony-doped tin oxide particles. The Sb ratio in the antimony-doped tin oxide particles was at least 0.04 and no greater than The pale-color toners of Examples 1 to 8 each had an appropriate tint, and an image with desired image density and excellent fixability was formed with the pale-color toner of any of Examples 1 to 8

By contrast, any of the pale-color toners of Comparative Examples 1 to 7 did not have the above features. As such, at least one of the tint and image density and fixability of the formed image was evaluated as poor.

Specifically, the external additive particles (b) used in the pale-color toner of Comparative Example 1 were antimony-doped tin oxide particles with an Sb ratio of less than 0.04. Because the external additive particles (b) had a comparatively high electric resistance, the image density of the formed image is determined to have been insufficient.

The external additive particles (e) used in the pale-color toner of Comparative Example 2 were antimony-doped tin oxide particles with an Sb ratio of greater than 0.31. The external additive particles (e) had a tinge of black. As such, the pale-color toner of Comparative Example 2 is determined to have had an inappropriate tint.

The external additive particles (f) and (i) respectively used in the pale-color toners of Comparative Examples 3 and 4 had a number average primary particle diameter of less than 30 nm or greater than 305 nm. Because the external additive particles (f) and (i) were buried in or detached from the toner mother particles in continuous image formation, the image density of the formed images are determined to have been insufficient.

The pale-color toner of Comparative Example 5 did not use the specific external additive particles. The external additive particles (m) and (n) respectively used in Comparative Examples 6 and 7 were conductive titanium oxide particles or titanium oxide particles. The external additive particles (m) and (on) are determined to have relatively high electric resistance. Furthermore, it is determined that the external additive particles (m) tend to readily detach from the surfaces of the toner mother particles because ATO acting as an aggregating agent agglomerates on the surfaces of the toner mother particles. Consequently, the pale-color toners of Comparative Examples 5 to 7 are determined to have been insufficient in image density of the formed images.

What is claimed is:

1. A pale-color toner comprising toner particles, wherein the toner particles each include a toner mother particle and an external additive attached to a surface of the toner mother particle, the external additive includes specific external additive particles, the specific external additive particles have a number average primary particle diameter of at least 100 nm and no greater than 200 nm, the specific external additive particles include antimony-doped tin oxide particles, and a ratio ($M_{Sb}/(M_{Sn}+M_{Sb})$) of a mass ($M_{Sb}$) of an antimony atom to a total of the mass ($M_{Sb}$) of the antimony atom and a mass ($M_{Sn}$) of a tin atom in the antimony-doped tin oxide particles is at least 0.20 and no greater than 0.28.

2. The pale-color toner according to claim 1, wherein the specific external additive particles contain no chlorine atoms; or contain chlorine atoms and the chlorine atoms have a content ratio of greater than 0.000% by mass and no greater than 0.020% by mass in the specific external additive particles.

3. The pale-color toner according to claim 2, wherein the specific external additive particles contain the chlorine atoms, and the chlorine atoms in the specific external additive particles have a content ratio of at least 0.001% by mass and no greater than 0.020% by mass.

4. The pale-color toner according to claim 1, wherein the toner mother particles contain a binder resin and a colorant, and the colorant includes a yellow colorant.

* * * * *